INVENTORS
Douglas G. Noiles, Goliardo Miale & Henry Goebel.

Feb. 18, 1964    D. G. NOILES ETAL    3,121,448
GRID MANUFACTURING APPARATUS
Filed Nov. 4, 1960    4 Sheets-Sheet 2

Feb. 18, 1964   D. G. NOILES ETAL   3,121,448
GRID MANUFACTURING APPARATUS

Filed Nov. 4, 1960                                4 Sheets-Sheet 3

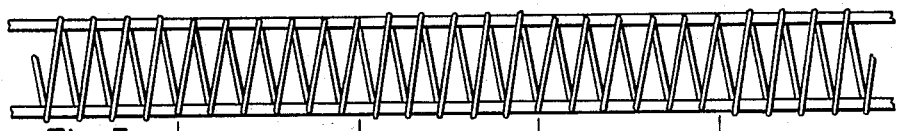
Fig. 5. |←—Tight Turns—→|←—Loose Turns—→|←—Tight Turns—→|
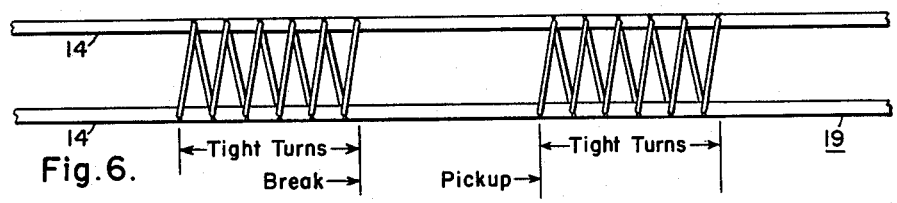
Fig. 6. |←—Tight Turns—→|　　　　|←—Tight Turns—→|
　　　　|←—Break—→|←—Pickup—→|
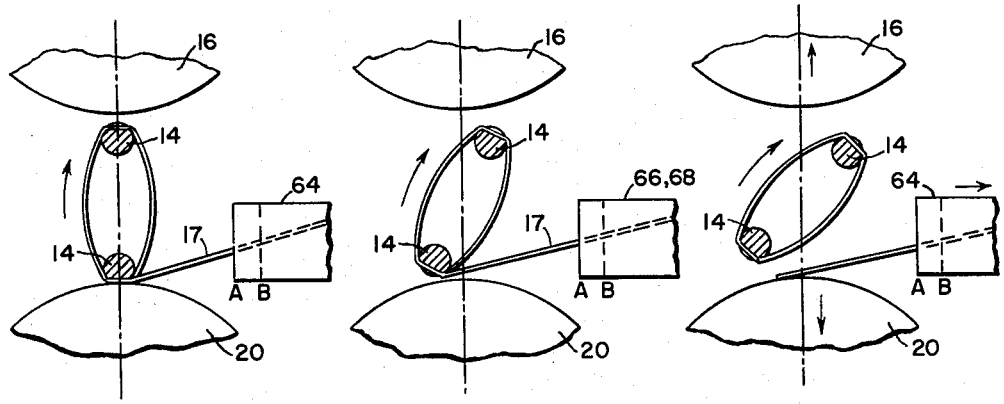
Fig. 7A.　　　　Fig. 7B.　　　　Fig. 7C.
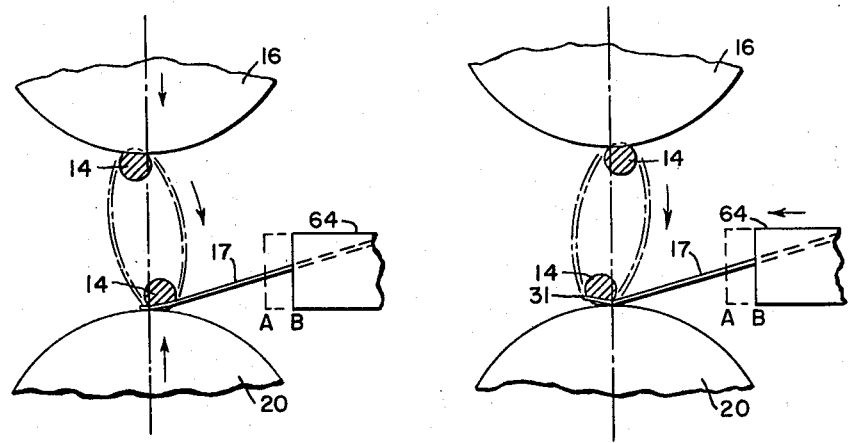
Fig. 8A.　　　　Fig. 8B.

Patented Feb. 18, 1964

3,121,448
GRID MANUFACTURING APPARATUS
Douglas G. Noiles and Goliardo Miale, Bath, and Henry Goebel, Delhi, N.Y., assignors to Westinghouse Electric Corporation, East Pittsburgh, Pa., a corporation of Pennsylvania
Filed Nov. 4, 1960, Ser. No. 67,369
2 Claims. (Cl. 140—71.5)

This invention relates to the manufacture of grid electrodes for electron discharge devices, and more particularly to a method and apparatus for making grid electrodes for electron tubes.

A grid structure of the type to which the present invention relates usually comprises a pair of relatively heavy wires which are generally referred to as support wires or side rods, about which a relatively fine wire which is referred to as a lateral wire or grid wire is helically wound and secured by suitable means such as welding or notching and peening.

A typical grid for an electron tube is usually formed so that the turns of the grid wire are terminated a short distance from the ends of the support wires so that the ends of the support wires may be readily attached to the supporting structure within the tube. Since the individual grid is a physically relatively short structure, the usual practice is to form a plurality of grids in one operation. The usually grid machine normally provides for the winding of a plurality of grid wires continuously on the support wires to form a grid strip such as illustrated in FIG. 5. The grid strip comprises all of the turns of the wanted or tight turns of the grid wire which are secured to the support members and the unwanted or loose turns of the grid wire which are not usually secured to the support wires.

The grid strip, after removal from the grid machine, is cut apart into individual grid electrodes and the unwanted turns or loose turns of grid wire are removed from the individual grid electrodes producing a grid having the tight turns of grid wire attached to the support wires and having the ends of the support wires free of grid wire.

Several methods have been devised to remove the unwanted turns of grid wires from the support wires, such as manually severing the wire, or burning off the unwanted turns by means of an electric spark, but each of these methods requires an additional operation to remove the unwanted turns of grid wire from the support wires. This operation, of course, reduces production and increases the expense of making grids.

In copending application Serial No. 814,004 by Anderson et al., filed May 18, 1959, entitled "Grid Making Machine," now U.S. Patent 3,106,943 and assigned to the same assignee, an apparatus is described for winding grids at high speeds such that no grid wire is wound on the end portions of the support members and in which grids suitable for use in electron tubes can be produced without the need of an operation for removing unwanted grid wire from the grid electrodes. This apparatus still uses the conventional rotary type grid making machine.

Briefly, this copending application describes an apparatus in which the grid laterals are wound in the conventional manner throughout the tight turn section. When the last tight turn has been peened into a support rod, the lateral or grid wire is broken close to the support member and the normal rotation and longitudinal travel of the support rods continues without any loose turns being wound until the grid wire is picked up and peened into the support member at the beginning of the winding of the first tight turn of the next grid on the grid strip. This mode of operation is continued throughout the strip and a grid strip such as that shown in FIG. 6 is obtained.

This invention describes an improved mechanism over the copending application for causing the wire to break and pick up to provide an improved grid.

It is another object of this invention to provide an improved apparatus and method for automatically manufacturing grid electrodes for an electron tube.

It is a further object to provide an improved apparatus and method for winding a grid strip such that the grid wire is not wound on certain predetermined portions of the support member.

It is another object to provide an improved actuating mechanism for causing the grid wire to break and pick up.

It is another object to provide an improved method of picking up the wire and securing it to the support rod at the start of the winding of a grid member in order to control the length of the tail.

It is still another object to provide improved lateral wire gripping jaw members which are self-aligning, readily replaceable and entirely practical to manufacture and use.

These and other objects of this invention will be apparent from the following description, taken in accordance with the accompanying drawings throughout which like reference characters indicate like parts and in which the drawings form a part of this application and in which:

FIG. 5 shows a conventional wound grid strip;

FIG. 6 shows a grid strip wound according to the teachings of this invention;

FIG. 7A is a diagrammatic view of the relative positions of the notching wheel, peening wheel, side rods, lateral wire and wire break head prior to the break operation;

FIG. 7B is a diagrammatic view similar to FIG. 7A at the instant of the break operation of the lateral wire;

FIG. 7C is a diagrammatic view similar to FIG. 7A subsequent to the break operation;

FIG. 8A is a diagrammatic view of the relative positions of the notching wheel, peening wheel, side rods, lateral wire and wire break head at the start of the pick up operation; and FIG. 8B is a diagrammatic view similar to FIG. 8A subsequent to the pick up operation and illustrating the lateral wire being notched into the side rod.

Figure 1:
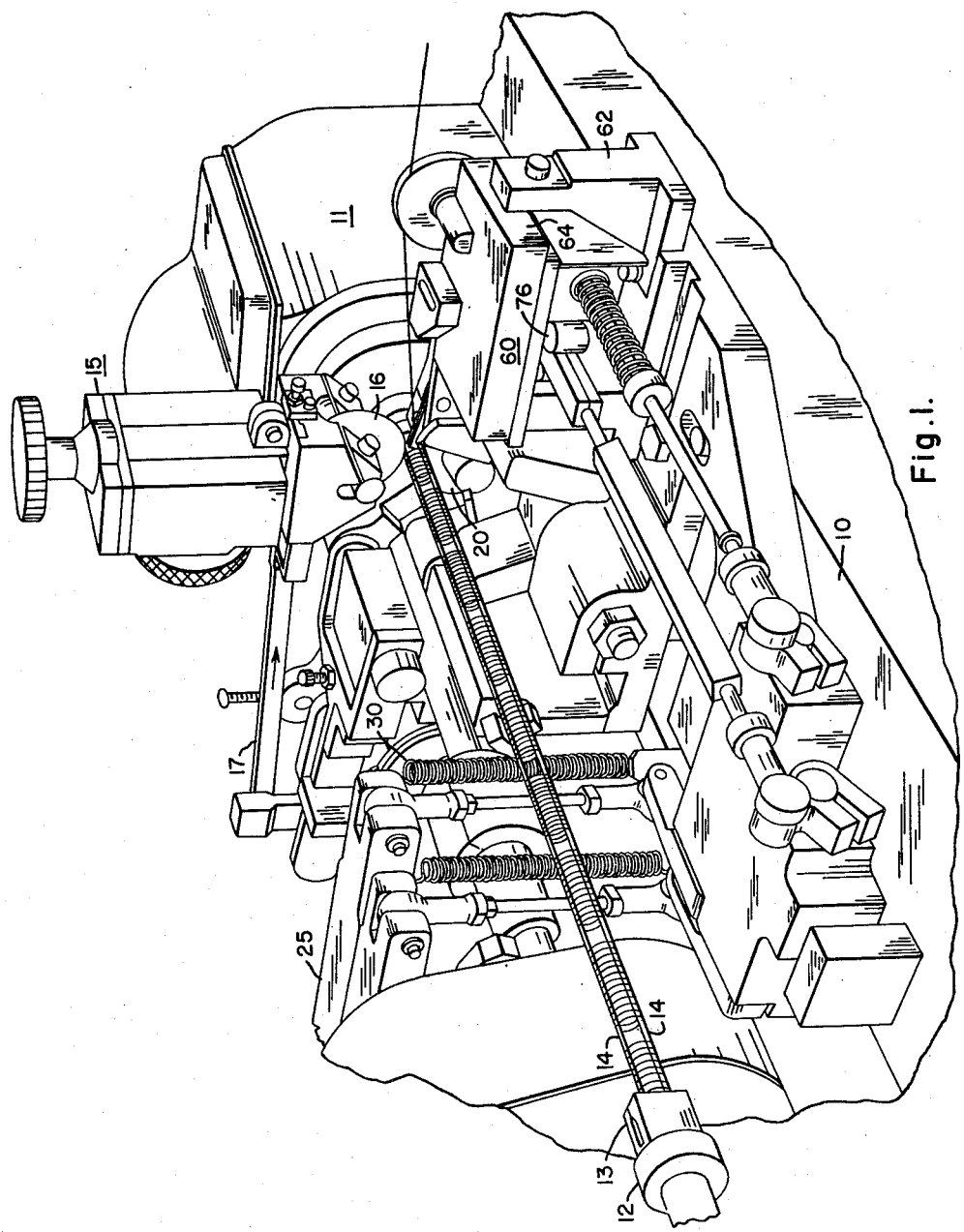
FIGURE 1 shows a perspective view of a grid winding machine incorporating the teachings of this invention.
Figure 2:
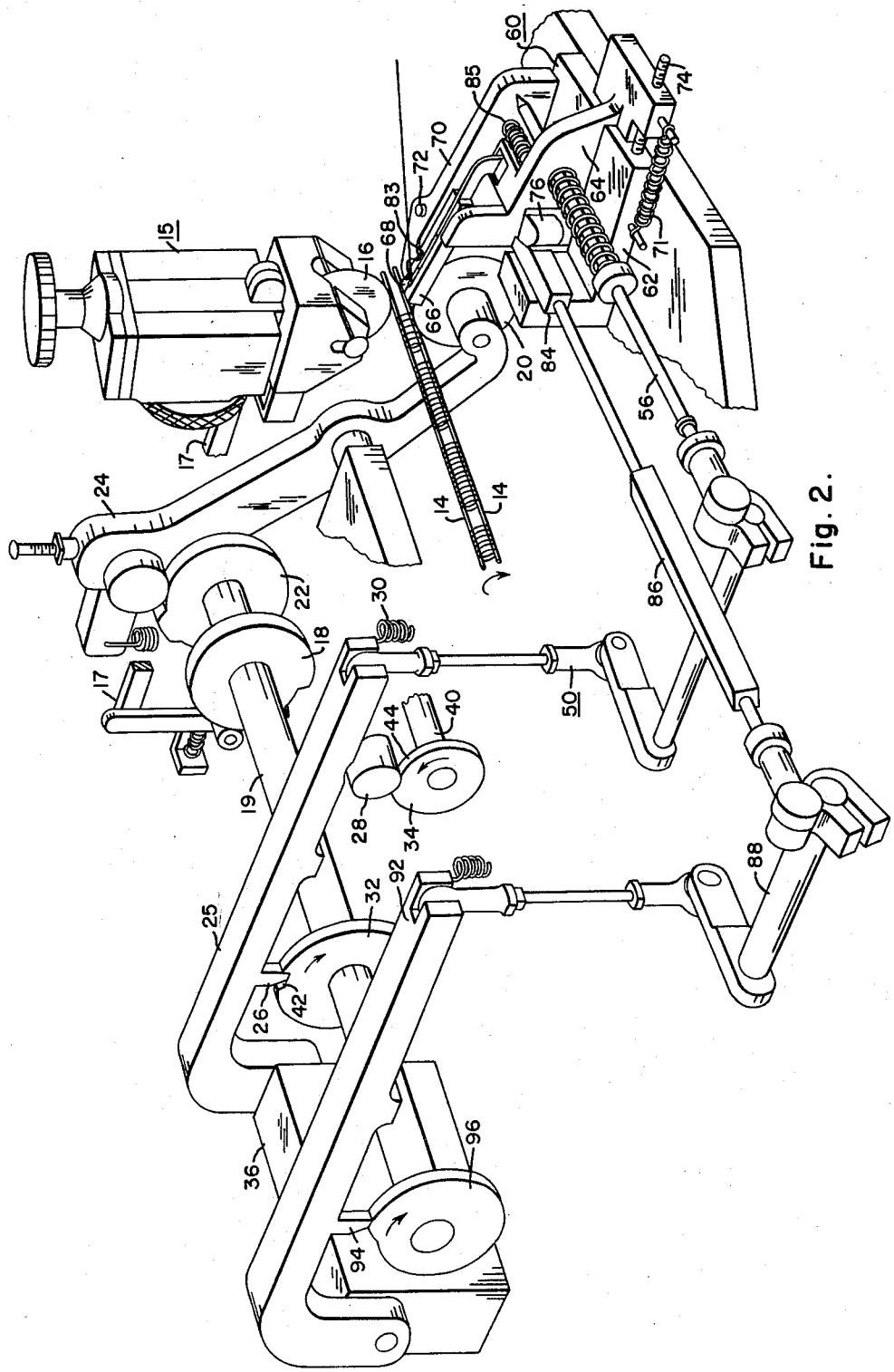
FIG. 2 shows a diagrammatic view of a portion of the grid winding machine incorporating the teaching of this invention.

Referring to FIGS. 1 and 2, a view of a portion of a grid making machine employing the invention is shown. The invention, in general, comprises a precision system that takes the form of attachment that can be easily adapted to the standard rotary grid type lathe. The standard rotary grid lathe is constructed similar to a conventional lathe and comprises a bed plate 10 upon which is supported at one end a head stock assembly 11, and at the other end a tail stock assembly, not shown. The head stock assembly 11 includes a rotary head comprising a main spindle driven by suitable drive means. A tubular draw bar 12 rotates in the tail stock assembly and is provided at one end with a clamp 13 and at its other end with a split nut, not shown. A lead screw, not shown, is provided in which one end is rotatively mounted in the tail stock assembly and the other end is positioned to engage the split nut on the draw bar 12. Each support member or side rod 14 is automatically fed in a continuous length from a spool, not shown, carried within a yoke on the outer end of the head spindle of the head stock assembly 11. The support members 14 pass through channels extending longitudinally through the head spindle. A mandrel is secured to the end of the head spindle and grooves are provided in the mandrel for the support members 14. The support members are secured to the draw bar 12 by the clamp 13. As the tail stock retreats, the support wires 14 are drawn through the mandrel of the head stock assembly 11. A notching head assembly 15 including a wheel 16 is supported from a suitable bracket from the head stock assembly 11 immediately above the mandrel. The notching wheel 16 forms notches or slots in spaced relation along the supporting wires 14 at the proper intervals as the support wire 14 is carried bodily under the notching wheel 16 by the rotation of the head spindle. The notching mechanism 15 is mounted on the end of an arm 21 and the other end of the arm through suitable linkage engages a cam 18 mounted on a cam shaft 19 which makes one turn for every grid. The cam member 18 normally permits the notching wheel 16 to be forced against the support wires 14 with sufficient force to make the necessary notches. However, the cam surface of the cam 18 is provided with an indented portion to permit the notching wheel 16 to move forward and out of contact with rotating side rods 14 during that period when normally the loose turns would be wound on the side rods 14.

A notch closing or peening wheel 20 is mounted beneath the rotating side rod members 14 and spaced with respect to the notching wheel 16 so that the end of the next one half revolution of the grid strip the notch will be under the peening wheel 20. The peening wheel 20 presses in or deforms the edge of the notch and closes the notch so that the grid wire is firmly secured to and embedded in the supporting wire 14. The peening wheel 20 is also connected by means of suitable linkage 24 to a cam member 22 located on the back cam shaft 19 so that it also moves away in response to the cam member 22 on the cam shaft and does not contact the side rods 14 during the interval of loose turns between the adjacent sections of tight turns on the grid strip.

The lateral wire 17 is fed into the notches provided in the side rods 14 and the mechanism for doing this will be described later. The winding operation is started by securing the support members 14 by means of the clamp 13 on the draw bar 12. The half nut is closed on the lead screw so that the lead screw retreats due to the rotation of the draw bar 12 and the support members 14 are drawn through the channels in the head spindle and along the opposite edges of the mandrel. The notching wheel 16 is mounted in such a position that its periphery cuts a notch in each support member 14 and the support member 14 is carried under the notching wheel 16 by the rotation of the mandrel. The grid lateral wire 17 is positioned within this notch and secured therein by the peening wheel 20 as the support member 14 and the grid lateral wire are carried over the peening wheel 20 by the rotation of the mandrel. The above description is that of a conventional well known rotary grid machine.

For the purpose of description of our invention, the wire break mechanism may be divided into three basic component sections which coact to perform the stated objects. These component sections are: the single arm actuating mechanism for causing the wire to break and pick up; the single arm actuating means for retracting the gripper jaws which hold the lateral wire after the wire is broken in order to control the length of the tail when the wire is picked up and peened into the support rods of the structure of the lateral wire; and gripper jaws which are self-aligning, readily replaceable and entirely practical to manufacture and use.

The single actuating arm mechanism for causing the wire to break and pick up is shown in detail in FIG. 2. This mechanism comprises an overhead arm 25 pivotally mounted to the frame and includes a pin follower 26, a roller type cam follower 28, an adjustable tension spring 30, a coarse cam 32 and a fine cam 34. The overhead arm 25 is pivotally attached to an upright member 36 which is in turn secured to the base of the grid lathe. The arm 25 extends across both the rear cam shaft 19 and a front shaft 40 of the grid lathe at substantially a right angle. The coarse cam 32 is attached to the rear cam shaft 19 and is driven at the rate of one revolution per each complete grid by means of suitable gearing from the main spindle. The fine cam 34 is attached to the front shaft 40 of the grid lathe which makes one complete revolution for each complete turn of the grid lateral wire on the support rods 14. The front shaft 40 is driven by one to one gearing from the main spindle in the head stock 11 of the grid lathe. The front shaft 40 revolves at a considerably greater speed than the rear shaft 19. The pin follower 26 is provided on the arm 25 at a point opposite the coarse cam 32 and the pin follower 26 is held in contact with the coarse cam 32 by the tensioning spring 30. The coarse cam 32 is provided with a notch 42 and the pin follower 26 falls into the notch 42 due to the bias of the tensioning spring 30 when the rear shaft 19 rotates into position. The fine cam 34 is provided with a rapid drop contour portion 44. The roller type follower 28 is provided on the overhead arm 25 opposite the fine cam 34.

Figure 3:
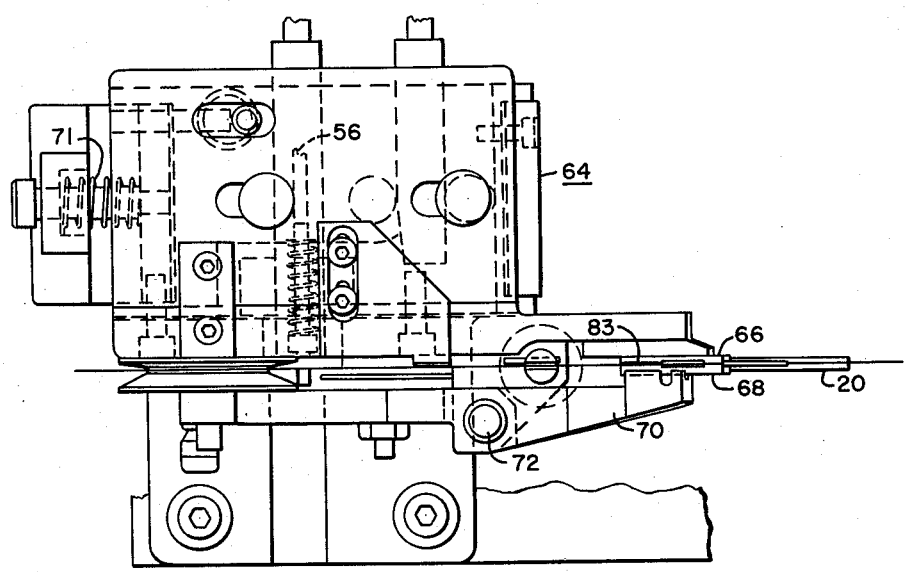
FIG. 3 is a top view of the lateral wire winding mechanism.
Figure 4:
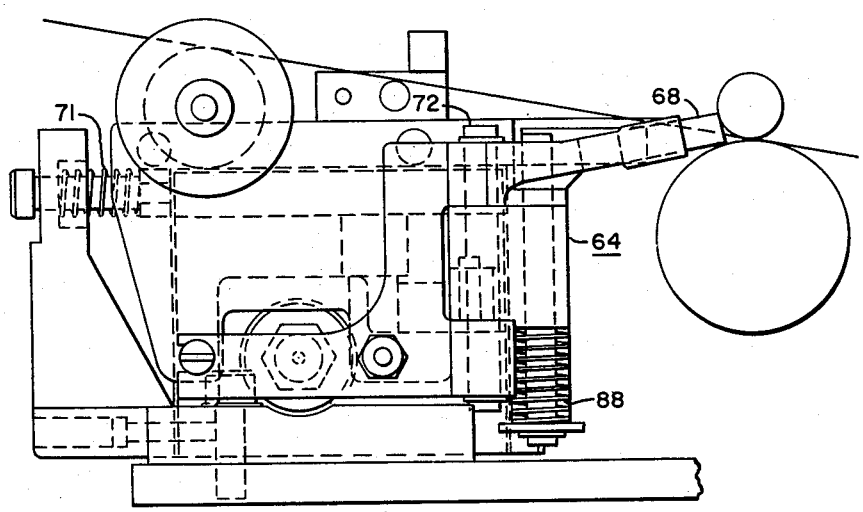
FIG. 4 is a side view of the mechanism shown in FIG. 3.

The free end of the arm 25 is connected through a linkage system 50 to a push rod 56. The push rod 56 in turn actuates a lever 70 on the wire break head assembly 60. The wire break assembly 60 as shown in detail in FIGS. 3 and 4 is mounted on the base 10 in front of the machine and adjacent the notching and peening wheels 16 and 20. The assembly 60 includes a fixed base member 62 and a movable assembly 64 spring biased to the fixed base 62. The movable assembly head 64 is mounted to move in or out with respect to the grid strip and perpendicular thereto. The assembly head 64 includes a fixed wire gripper jaw 66 and a movable wire gripper jaw 68. The grid lateral wire 17 is fed between jaws 66 and 68 onto the grid support rods 14. The movable jaw 68 is seated in the jaw holder or lever member 70. The member 70 is secured to the assembly by a pin 72 so that the member 70 can rotate about the vertical located pin 72. The push rod 56 is positioned to actuate the member 70 thereby pressing the member 70 against the jaw 68 causing it to be forced against the jaw 66. This causes the jaws 66 and 68 to grip and hold the lateral wire 17 stopping its flow and resulting in breakage of the wire.

The operation of this mechanism may be described as follows. When the pin follower 26 falls into the notch 42 on the coarse cam 32, the roller follower 28 makes contact with the fine cam 34. When the roller follower 28 first touches the cam 34 it is on the high dwell portion of cam 34, and the tip of the push rod 56 comes to about .010 inch from the lever arm 70. The follower 28 drops off the high portion of cam 34 at the instant the wire is to be broken. At that instant, the arm 25 is pulled down by the spring 30, this motion is transmitted by the linkage system 50 so that the tip of the push rod 56 strikes the lever arm member 70. This impact which lasts about 90° of rotation of the fine cam 34 is for about 1/80 of a second. The grid strip rotates at about 1200 revolutions per minute. This impact increases the pressure of movable jaw 68 on the fixed jaw 66 of the wire gripper so that the lateral wire 17 ceases to flow between the jaws and is broken off by the rotation of the grid support rods 14. This operation is shown in FIGS. 7A, 7B and 7C. After one complete revolution of 34, the pin follower 26 rises out of the notch onto the surface of the coarse cam 32 and the arm 24 moves upward against the tension of spring 30 so that the end of the push rod returns to its normal position about .015 inch from the lever arm 70 of the movable gripper jaw. Simultaneously with the action of the coarse cam 32 activating the arm 25 of the wire break mechanism, the cam members 18 and 22 on the cam shaft also actuate the notching and peening rollers 16 and 20 so as to retract these two members from the side rods 14 with the broken end of the wire riding on the peening roller 20. This is shown in FIG. 7C. The notching and peening roller 16 and 20 are retracted for a period of time corresponding to the desired space between grid windings and according to the configuration of the cam members 18 and 22. At this time, the notching wheel 16 moves in and notches a side rod 14 and when this notched side rod rotates to the peening wheel 20 forces the end of the broken wire into the notch, peens the wire in and the winding of the next grid is commenced. This operation is shown in FIGS. 8A and 8B.

It has been found that in such a wire break mechanism, that the length of the lateral wire 17 or tail 31 projecting from the side rod 14 at the commencement of the winding of the next grid is of great importance. Too short a tail can cause failure to pick up while too long a tail can cause electrical shorts when assembled in a tube. The optimum tail length is about ½ the side rod diameter. The diameters of typical side rods 14 may vary from .015 to .050 inch. This invention provides mechanism for ready adjustment of the tail length. Necessity for adjusting tail length (aside from ease of set up) is dictated by variations in lateral wire ductility from spool to spool, which require tail length adjustment at time of changing spools of lateral wire.

The wire break head 64 which is slidable within the member 62 is held in a constant position by spring 71 which urges the member 64 inward toward the grid strip but is resisted by a stop screw 74 is illustrated in FIG. 2. A roller 76 is also provided on the wire break head 64 which is engaged by a wedge member 84. The wedge member 84 is attached to the end of a push rod 86 which is, in turn, connected through a linkage system 88 to an overhead arm 92. The overhead arm 92 is also attached to the base 36 at the rear of the machine as in the case of the arm 25 and a pin follower 94 is provided thereon which engages a cam member 96 positioned on the cam shaft 19.

The operation of the retracting mechanism is as follows. The action and timing are controlled by the cam 96 which rotates once per grid. The cam 96 is timed so that immediately after the lateral wire is broken, the follower 94 drops off the high dwell portion of the cam 96. This allows the arm 92 to fall and transmit motion through linkage 88 to push rod 86 and wedge 84 is forced into engagement with the roller 76. The wedge member 54 works between the fixed member 62 and the roller 76. Therefore, the roller 76 causes the slide member 64 to move away from the winding position against the action of the spring 70. The displacement of the roller 76 and associated parts is controlled by adjustment of the linkage system. The push rod 86 has right and left hand threaded ends so that the length of the link is readily adjustable. The rest of the linkage is essentially fixed. With the head 64 retracted and the wire tail at a desired position, the wire is picked up by the peening roller 20 and inserted in the notch provided in the support member 14. This is illustrated in FIGS. 8A and 8B. During winding of the grid the cam member 96 causes follower 94 and arm 92 to rise slowly. This motion is transmitted through the linkage 88 to slowly retract wedge 84 and allow head 64 to advance to its initial position. The advance of head 64 is so slow so as to not disturb winding of the tight turn portion of grid. The slope of the wedge 84 is sufficient so that it is always moved away from contact with the roller 76 in initial position. This means that adjusting the retraction displacement by adjusting push rod 86 affects only the position of the head 64 when it is retracted. The head 64 always returns to its initial position 60 so the action at the time of break is not affected by the retraction adjustment.

Referring in detail to FIGS. 3 and 4, the structure of the gripper jaws 66 and 68 is shown. The fixed jaw 66 is fastened to the wire break head 64. The movable gripper jaw 68 is held into position by the clamping lever 70.

The movable gripper jaw 68 is retained by the clamping lever 70 to maintain a position in contact with the fixed gripper jaw 66 so that the outlines of the two jaws coincide exactly. At the same time, the movable gripper jaw 68 is free to rotate on a ball like projection which sits in a groove in the clamping lever 70. This provision allows the clamping surface of the two gripper jaws 66 and 68 to come in exact parallel alignment. The mating surface of the gripper jaws 66 and 68 are ground and lapped to a flat and smooth surface, such as that on a toolmaker's gauge block. The center portions of these mating surfaces are ground below the lapped surface to make lapping easier and to allow an entry point for the lateral wire. The lateral wire 17 enters above the gripper jaw and passes between the front polished surface of the gripper jaws 66 and 68. To make the front polished surfaces parallel to the thickness of the lateral wire and maintain contact with the lateral wire with a full distance of the front polished surfaces, a thin shim 83 is situated between the two back polished surfaces of the gripper jaws. The shim 83 has the same thickness as the diameter of the lateral wire 17.

In the operation of these gripper members, the movable gripper 68 is urged towards the fixed gripper jaw 66 by action of a spring 85. Pressure between the jaws 66 and 68 is small enough to allow the lateral wire to run between them. Drag on the wire 17 as it passes between the jaws 66 and 68 contributes a major portion of the total tension on the wire 17 as it is wound on the grid. The pressure is great enough to hold the wire 17 in a fixed position after the wire 17 is broken from the grid. The pressure is continuous and the jaw faces 66 and 68 in contact with the wire 17 are of a tungsten carbide material.

The operation of the break and pick-up attachment is best understood when it is described in full operation in conjunction with the grid lathe. In the following description, only the activities taking place during the winding operation which are directly connected with the wire break and pick up attachment will be described. The grid lathe is set up in a conventional manner and the necessary adjustments made to the wire break and pick up assembly. Upon starting the grid lathe the grid is wound in a conventional fashion throughout the tight turns of the grid. The gripper jaws 66 and 68 apply some pressure to the lateral wire 17 so that the drag on the wire 17 as it passes between the jaws contributes a major portion of the total tension on the wire 17 as it is wound on the grid. At the completion of the winding of the grid, the cams 42 and 44 through linkage 50 force the jaws 66 and 68 together so that the lateral wire 17 ceases to flow between the jaws and is broken by rotation of the grid strip. This is illustrated in FIG. 7. Simultaneously with the action of the wire break in breaking the lateral wire, the notching and peening members 16 and 20 retract from their operating position due to movement of the cam members 18 and 22 located on the cam shaft 19. After the wire is broken the cam 96 on the cam shaft 19 is in a position such that the follower 94 drops off the high dwell of the cam 96. This allows the arm 92 to fall and transmit motion through the linkage 88. This motion forces push rod 86 and wedge 84 into engagement with the roller 76. The wedge 84 works between the fixed member 62 and roller 76. The roller 76 moves out causing the slidable member 64 to move away from the winding position against the action of spring 71 to position (B) shown in FIGS. 7 and 8. The displacement of the roller 76 and associated parts is controlled by adjustment of the linkage 88 with the head 64 retracted and the tail 31 at desired length. In order to have flexibility of tail length adjustment, i.e., increase or decrease, the initial set up is made without the head retracted and with tail two or three times longer than is desired. Then head retraction must be used to achieve controlled tail length. Tail length can be controlled by timing of fine cam 34, but it is a difficult and unsatisfactory adjustment. The notching and peening rollers 16 and 20 move in at the start of the next grid. The notching roller 16 notches the side rod 14 and then the peening roller 20 carrying the tail 31 moves in and peens the lateral wire into the side rod 14 starting another grid. During the winding of this grid, the cam member 96 permits the arm 92 to rise slowly which is transmitted through the linkage 88 to slowly retract wedge 84 and allow the head 64 to advance to its initial position (A) prior to the end of the winding of the grid. The head 64 thus has returned to its rest or initial position (A) as shown in FIGS. 7 and 8 prior to the completion of the grid and the above operation is ready to repeat again in the manner described.

While the present invention has been shown in only one form, it will be obvious to those skilled in the art that this is not so limited but is susceptible of various other changes and modifications without departing from the spirit and scope thereof.

We claim as our invention:

1. A grid making machine comprising means for holding spaced support grid members, means for rotating said support members and simultaneously moving the same longitudinally, movable jaw means for guiding grid wire to said support members whereby upon said rotative and longitudinal movements said grid wire is wound around said support members, means for securing the grid wire at each of its points of contact with said support members, means for breaking said grid wire at a predetermined time, said breaking means comprising first and second cam members, each of said cam members having an indentation in their periphery, said first cam member mounted on a first shaft operatively associated for rotation at a first speed, said second cam member mounted on a second shaft operatively associated for rotation at a substantial higher rate of speed than said first cam member, a first elongated arm fixed at one end, said first arm having a first and second cam follower, said first cam follower held in contact with said first cam member by spring means, the free end of said first arm adapted to move a first distance when said first cam follower engages the indentation in the periphery of said first cam and to move a second distance when said second cam follower engages the indentation in the periphery of said second cam member whereby said first arm imparts a movement which is transmitted by a system of levers to close said grid wire guiding means whereby said grid wire between said grid wire guiding means and said support members is stretched to its breaking point due to rotation of said support grid members, said break of said wire occurring adjacent said support members, means for picking up the broken end of said grid wire, means for moving said movable jaw means to position the broken end of said grid wire with respect to said associated pickup means by a third cam member, said third cam member having an indentation in its periphery, said third cam member mounted on said first shaft and operatively associated for rotation at said first speed, an elongated second arm fixed at one end, said second arm having a cam follower, said third cam follower held in contact with said third cam member by spring means, the free end of said second arm adapted to move a first distance when said third cam follower engages the indentation in the periphery of said third cam member whereby said second arm imparts a movement which is transmitted by a system of levers to retract said movable jaw means after break to position the broken end of said wire with respect to said pickup means and then return said jaw means to said break position prior to the next break operation.

2. A grid making machine comprising means for holding spaced support grid members, means for rotating said support members and simultaneously moving the same longitudinally, movable jaw means for guiding grid wire to said support members whereby upon said rotative and longitudinal movements said grid wire is wound around said support members, means for securing the grid wire at each of its points of contact with said support members, means for breaking said grid wire at a predetermined time, said breaking means comprising first and second cam members, each of said cam members having an indentation in their periphery, said first cam member mounted on a first shaft operatively associated for rotation at a first speed, said second cam member mounted on a second shaft operatively associated for rotation at a substantial higher rate of speed than said first cam member, a first arm fixed at one end, said first arm having a first and second cam follower, said first cam follower held in contact with said first cam member by spring means, the free end of said first arm adapted to move a first distance when said first cam follower engages the indentation in the periphery of said first cam and to move a second distance when said second cam follower engages the indentation in the periphery of said second cam member whereby said first arm imparts a movement which is transmitted by a system of levers to close said grid wire guiding means whereby said grid wire between said grid wire guiding means and said support members is stretched to a breaking point due to rotation of said support grid members, said break of said wire occurring adjacent said support members, said grid wire guiding means including a fixed guide member and a movable guide member, said movable guide member including a projection member mounting said movable guide to a support to permit rotation of said movable guide therein, means for picking up the broken end of said grid wire, means for moving said jaw means to position the broken end of said grid wire with respect to associated pickup means by a third cam member, said third cam member having an indentation in its periphery, said third cam member mounted on said first shaft and operatively associated for rotation at said first speed, a second arm fixed at one end, said second arm having a third cam follower, said third cam follower held in contact with said third cam member by spring means, the free end of said second arm adapted to move a first distance when said third cam follower engages the indentation in the periphery of said third cam member whereby said second arm imparts a movement which is transmitted by a system of levers to retract said movable jaw means after break to position the broken end of said wire with respect to said pickup means and then return said jaw means to said break position prior to the next break operation.

References Cited in the file of this patent

UNITED STATES PATENTS

| | | |
|---|---|---|
| 1,978,108 | Howald et al. | Oct. 23, 1934 |
| 2,441,228 | Schneider et al. | May 11, 1948 |
| 3,037,533 | Chase | June 5, 1962 |
| 3,048,313 | Neale | Aug. 7, 1962 |

FOREIGN PATENTS

| | | |
|---|---|---|
| 161,001 | Australia | Feb. 8, 1955 |